(12) United States Patent
Hebda et al.

(10) Patent No.: US 9,033,288 B2
(45) Date of Patent: May 19, 2015

(54) SYSTEM AND METHOD FOR MOUNTING A WIRE HARNESS WITHIN A VEHICLE INTERIOR

(75) Inventors: Joseph A. Hebda, Trenton, MI (US); Steven E. White, Farmington Hills, MI (US)

(73) Assignee: JOHNSON CONTROLS TECHNOLOGY COMPANY, Holland, MI (US)

( * ) Notice: Subject to any disclaimer, the term of this patent is extended or adjusted under 35 U.S.C. 154(b) by 332 days.

(21) Appl. No.: 13/462,462

(22) Filed: May 2, 2012

(65) Prior Publication Data
US 2013/0291358 A1   Nov. 7, 2013

(51) Int. Cl.
*F16L 3/00* (2006.01)
*B60R 16/02* (2006.01)
*H02G 3/30* (2006.01)
*B23P 17/00* (2006.01)
*H02G 3/00* (2006.01)

(52) U.S. Cl.
CPC .............. *B60R 16/0215* (2013.01); *H02G 3/26* (2013.01); *H02G 3/30* (2013.01)

(58) Field of Classification Search
CPC ............ H02G 3/30; H02G 3/26; F16L 3/233; F16L 3/2334; B60R 16/0215
USPC ......... 29/407.02, 525.04, 525.01; 248/73, 71, 248/74.3, 63, 68.1; 24/16 PB, 17 AP
See application file for complete search history.

(56) References Cited

U.S. PATENT DOCUMENTS 4,805,856 A * 2/1989 Nicoli et al. ................. 248/74.3
5,042,114 A * 8/1991 Parrish ........................ 24/16 PB

* cited by examiner

*Primary Examiner* — John C Hong
(74) *Attorney, Agent, or Firm* — Fletcher Yoder, P.C.

(57) ABSTRACT

A cable tie for mounting a wire harness within a vehicle interior includes a mounting portion having an opening configured to receive a fastener for securing the cable tie to a support structure. The cable tie also includes a tie portion extending from the mounting portion. The tie portion is configured to wrap around the wire harness to secure the wire harness to the cable tie, and the tie portion is laterally offset from the opening along a direction substantially perpendicular to a longitudinal axis of the tie portion.

18 Claims, 4 Drawing Sheets

SYSTEM AND METHOD FOR MOUNTING A WIRE HARNESS WITHIN A VEHICLE INTERIOR

BACKGROUND

The invention relates generally to vehicle electrical wiring systems, and more specifically, to a system and method for mounting a wire harness within a vehicle interior.

Vehicle electrical systems are typically configured to provide electrical power and/or control signals to various electrical components throughout a vehicle. For example, a wire harness may deliver electrical power and/or control signals to a seat for driving such electrical components as motors, heaters, and lights, among others. To limit movement of wire harnesses during vehicle operation, cable ties may be employed to secure the wire harnesses to support structures (e.g., floor pan, door panels, etc.) within the vehicle interior. Certain cable ties include a mounting portion configured to secure the cable tie to the support structure, and a tie portion configured to wrap around the wire harness to secure the wire harness to the cable tie. In certain configurations, a push pin may be employed to secure the mounting portion to the support structure. By way of example, an installer may insert a push pin through the mounting portion and into the support structure, thereby mounting the cable tie within the vehicle interior. Unfortunately, it may be difficult for the installer to determine whether the push pin is properly inserted. An improperly inserted push pin may become dislodged during vehicle operation, thereby enabling the wire harness to move within the vehicle interior. In addition, it may be difficult to remove a properly installed push pin, thereby increasing the duration and costs associated with vehicle maintenance.

BRIEF DESCRIPTION OF THE INVENTION

The present invention relates to a cable tie for mounting a wire harness within a vehicle interior. The cable tie includes a mounting portion having an opening configured to receive a fastener for securing the cable tie to a support structure. The cable tie also includes a tie portion extending from the mounting portion. The tie portion is configured to wrap around the wire harness to secure the wire harness to the cable tie, and the tie portion is laterally offset from the opening along a direction substantially perpendicular to a longitudinal axis of the tie portion.

The present invention also relates to a cable tie for mounting a wire harness within a vehicle interior. The cable tie includes a tie portion configured to wrap around the wire harness to secure the wire harness to the cable tie. The cable tie also includes a mounting portion configured to secure the cable tie to a support structure. The tie portion extends from the mounting portion, and the mounting portion includes a slot configured to receive a distal end of the tie portion. The mounting portion also includes a recess adjacent to the slot, and configured to establish a gap between a support-facing surface of the mounting portion and a mounting surface of the support structure.

The present invention further relates to a method for mounting a wire harness within a vehicle interior. The method includes wrapping a tie portion of a cable tie around the wire harness to secure the wire harness to the cable tie, and inserting a fastener within a first opening in a mounting portion of the cable tie. The tie portion extends from the mounting portion, and the fastener is configured to engage a second opening within a support structure to secure the cable tie to the support structure. The method also includes applying torque to the fastener with a torque tool until a measured torque is greater than or equal to a desired torque.

DRAWINGS

DETAILED DESCRIPTION

Figure 1:
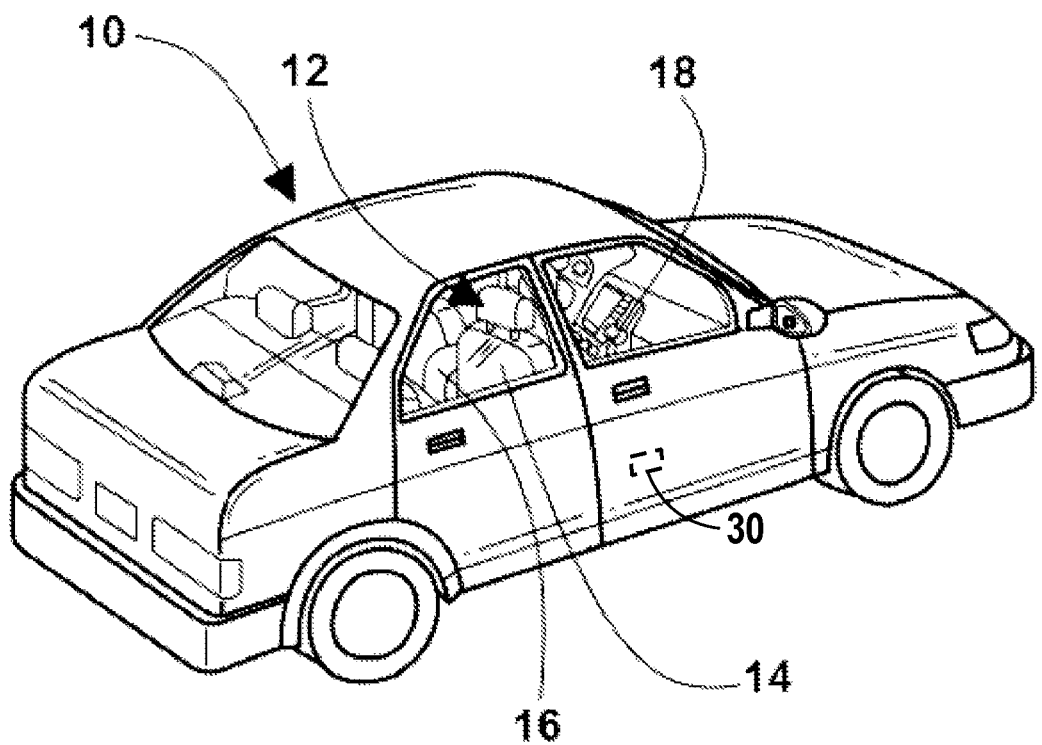
FIG. 1 is a perspective view of an exemplary vehicle that may include a cable tie for mounting a wire harness to a support structure within an interior of the vehicle.

FIG. 1 is a perspective view of an exemplary vehicle 10 that may include a cable tie 30 for mounting a wire harness to a support structure within the vehicle. As illustrated, the vehicle 10 includes an interior 12 having a seat 14, a floor console 16, and a center console 18. As will be appreciated, various electrical components may be incorporated within the seat 14, the floor console 16, and the center console 18. For example, the seat 14 may include electric motors configured to position the seat 14 within the interior 12, lights to illuminate various regions of the seat 14, and/or heaters to warm the seat 14 in cold conditions, among other electrical components. In addition, the floor console 16 and the center console 18 may include lights to illuminate various regions of the vehicle interior 12, gauges to provide vehicle operating data to the driver, and/or graphical displays, among other electrical components. Accordingly, the vehicle 10 may include multiple wire harnesses to provide electrical power and/or control signals to the electrical components within the seat 14, the floor console 16, and/or the center console 18.

To limit movement of wire harnesses during vehicle operation, cable ties may be employed to secure the wire harnesses to support structures (e.g., floor pan, door panels, etc.) within the vehicle interior 12. As discussed in detail below, each cable tie includes a mounting portion having an opening configured to receive a fastener for securing the cable tie to the support structure. The cable tie also includes a tie portion extending from the mounting portion, and configured to wrap around the wire harness to secure the wire harness to the cable tie. In certain embodiments, the tie portion is laterally offset from the opening along a direction substantially perpendicular to a longitudinal axis of the tie portion. The lateral offset is configured to enable a torque tool to engage the fastener without contacting the tie portion. In addition, the mounting portion may include a slot configured to receive a distal end of the tie portion, and a recess adjacent to the slot. The recess is configured to establish a gap between a support-facing surface of the mounting portion and a mounting surface of the support structure. The gap facilitates passage of the tie portion between the support-facing surface and the mounting surface when the cable tie is secured to the support structure, thereby enabling the cable tie to be mounted flush with the mounting surface.

Figure 2:
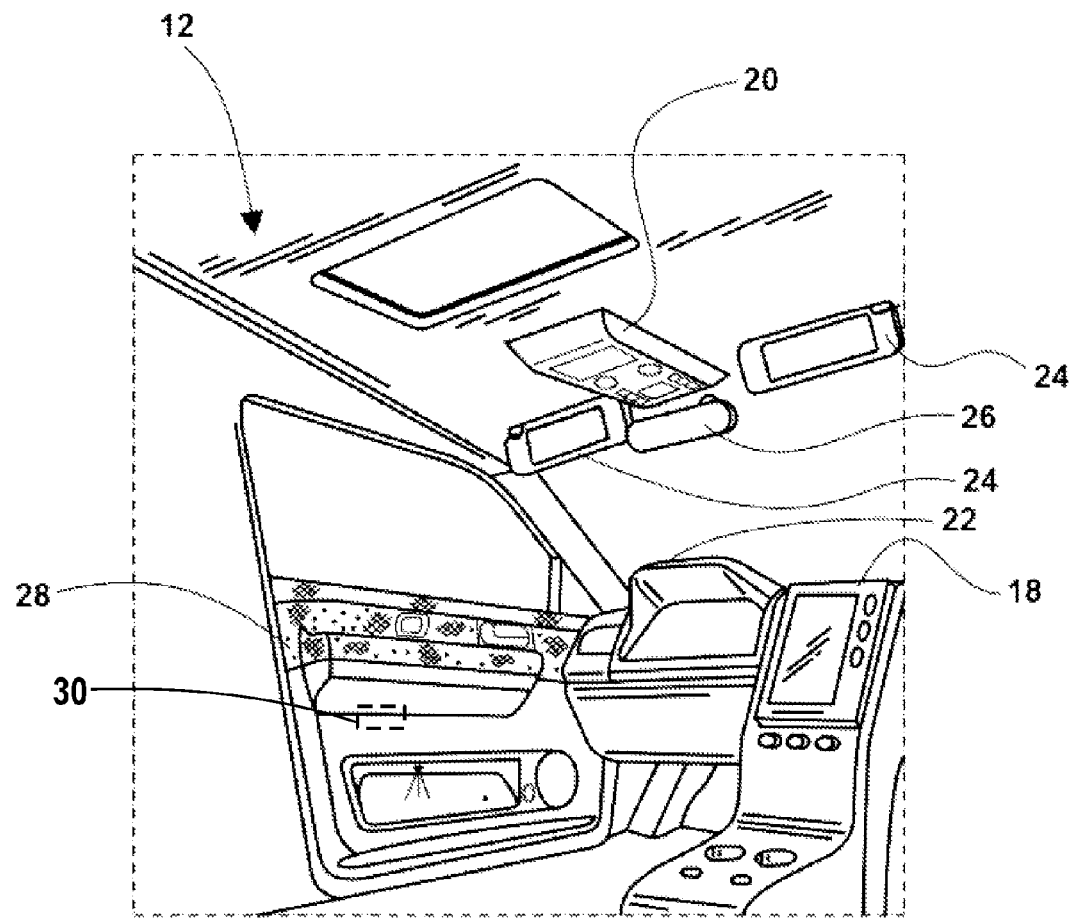
FIG. 2 is a perspective view of a part of the interior of the vehicle of FIG. 1.

FIG. 2 is a perspective view of a part of the interior 12 of the vehicle of FIG. 1. As illustrated, the vehicle interior 12 includes the center console 18, an overhead console 20, an instrument panel 22, sun visors 24, a rearview mirror 26, and a door panel 28. The vehicle 10 may include multiple wire harnesses to provide electrical power and/or control signals to electrical components within each of these vehicle interior structures. In addition, at least one cable tie 30 may be employed to secure each wire harness to a corresponding support structure within the vehicle interior 12. For example, a tie portion of the cable tie 30 may be wrapped around the wire harness to secure the wire harness to the cable tie 30. A fastener may then be inserted within a first opening in a mounting portion of the cable tie 30. Torque may be applied to the fastener with a torque tool to drive the fastener into engagement with a second opening in the support structure, thereby securing the cable tie 30 to the support structure. In certain embodiments, the toque tool may be configured to apply torque until a measured torque is greater than or equal to a desired torque. In addition, once the desired torque has been achieved, the torque tool may provide a positive indication to the installer (e.g., via illuminating an indicator, sounding an audible alert, etc.) that the fastener has been properly secured to the support structure. Accordingly, the possibility of improperly securing the cable tie 30 to the support structure is substantially reduced, as compared to configurations that employ manually inserted fasteners, such as push pins.

Figure 3:
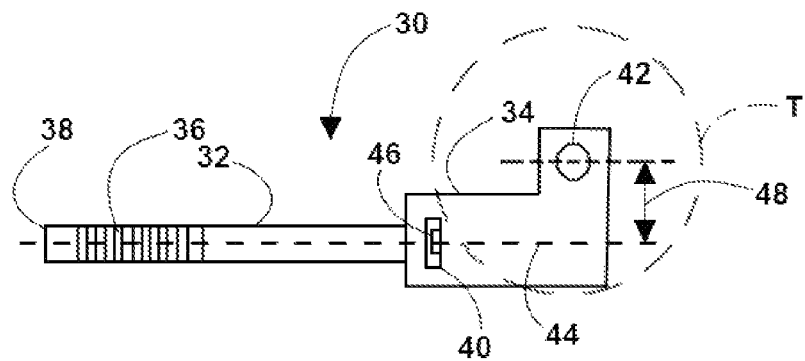
FIG. 3 is a top view of an embodiment of a cable tie configured to mount a wire harness within a vehicle interior.

FIG. 3 is a top view of an embodiment of a cable tie 30 configured to mount a wire harness within the vehicle interior 12. As illustrated, the cable tie 30 includes a tie portion 32 extending from a mounting portion 34. As discussed in detail below, the tie portion 32 is configured to wrap around a wire harness to secure the wire harness to the cable tie 30, and the mounting portion 34 is configured to secure the cable tie 30 to a support structure. As illustrated, the tie portion 32 includes multiple teeth 36 positioned adjacent to a distal end 38 of the tie portion 32. In addition, the mounting portion 34 includes a slot 40 configured to receive the distal end 38 of the tie portion 32. The mounting portion 34 also includes an opening 42 configured to receive a fastener for securing the cable tie 30 to a support structure. In the illustrated embodiment, the opening 42 is laterally offset from the tie portion 32 along a direction substantially perpendicular to a longitudinal axis 44 of the tie portion 32.

To secure a wire harness to the cable tie 30, the tie portion 32 is wrapped around the wire harness, and the distal end 38 of the tie portion 32 is inserted through the slot 40. The slot 40 includes a ratcheting mechanism 46 configured to engage at least one of the teeth 36 to block removal of the tie portion 32 from the slot 40. For example, each tooth may include an angled surface and a flat surface. As the angled surface engages a protrusion within the ratcheting mechanism 46, the protrusion retracts, thereby facilitating movement of the tie portion 32 through the slot 40. However, removal of the tie portion 32 from the slot 40 is blocked by contact between the flat portion of the tooth and the protrusion. Because the ratcheting mechanism 46 is configured to block removal of the tie portion 32 from the slot 40, the wire harness may be secured to the cable tie 30 by tightening the tie portion 32 around the wire harness.

Once the wire harness is coupled to the cable tie 30, the cable tie 30 may be secured to a support structure. For example, a screw may be inserted into the opening 42, and rotated to engage a threaded opening in the support structure. In certain embodiments, a torque tool may be employed to drive the screw in rotation. By way of example, an installer may insert a screw into the opening 42, and then drive the screw in rotation with a torque tool. Once a desired torque has been achieved, the torque tool may provide a positive indication to the installer (e.g., via illuminating an indicator, sounding an audible alert, etc.) that the screw has been properly fastened to the support structure. Accordingly, the possibility of improperly securing the cable tie 30 to the support structure is substantially reduced, as compared to configurations that employ manually inserted fasteners, such as push pins. In addition, during maintenance operations, the screw may be removed with a similar torque tool. As a result, the duration and costs associated with vehicle maintenance may be substantially reduced, as compared to configurations employing manually removable fasteners.

In certain embodiments, a lateral distance 48 between the opening 42 and the tie portion 32 may be particularly selected to accommodate the dimensions of the torque tool. By way of example, the opening 42 may be positioned such that the torque tool, as represented by the dashed circle T, may engage the screw without contacting the tie portion 32, thereby enabling the cable tie 30 to be secured to the support structure. In certain embodiments, the distance 48 may be more than about 5 mm, more than about 10 mm, more than about 15 mm, or more than about 20 mm. For example, the distance 48 may be between about 5 mm to about 20 mm, between about 5 mm to about 15 mm, or between about 10 mm to about 15 mm. While a screw is described above, it should be appreciated that other fasteners may be inserted within the opening 42 to secure the cable tie 30 to the support structure. For example, in certain embodiments, a bolt or rivet may be inserted within the opening 42 and secured to the support structure. In such embodiments, the offset distance 48 may be particularly selected to accommodate an appropriate tool for installing the desired fastener.

As will be appreciated, the cable tie 30 may be fashioned from a variety of materials. For example, in certain embodiments, the cable tie 30 may be formed from a polymeric material, such as nylon. However, it should be appreciated that the cable tie 30 may be formed from metal, such as aluminum or stainless steel, in alternative embodiments.

Figure 4:
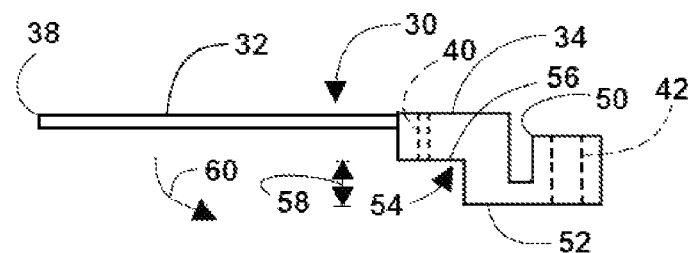
FIG. 4 is a side view of the cable tie shown in FIG. 3.

FIG. 4 is a side view of the cable tie 30 shown in FIG. 3. As illustrated, the opening 42 extends through a boss 50 on the mounting portion 34 of the cable tie 30. As will be appreciated, the length and wall thickness of the boss 50 may be particularly selected to accommodate the desired fastener. For example, the wall thickness of the boss 50 may be increased if higher torque fasteners are employed to support the additional load applied by the fastener to the mounting portion 34.

In the illustrated embodiment, a mounting surface 52 of the cable tie 30 is substantially flat, thereby enabling the cable tie 30 to mount substantially flush with a corresponding mounting surface of a support structure. Furthermore, the mounting portion 34 includes a recess 54 adjacent to the slot 40 and the mounting surface 52. The recess 54 is configured to establish a gap between a support-facing surface 56 of the mounting portion 34 and the mounting surface of the support structure. In certain embodiments, a length 58 of the gap may be selected to facilitate passage of the tie portion 32 between the support-facing surface 56 and the mounting surface when the cable tie 30 is secured to the support structure. Accordingly, the cable tie 30 may be mounted substantially flush with the mounting surface of the support structure, thereby providing a desirable visual appearance. In certain embodiments, the length 58 may be more than about 2 mm, more than about 5 mm, more than about 7 mm, or more than about 10 mm. For example, the length 58 may be between about 2 mm to about 10 mm, between about 2 mm to about 7 mm, or between about 2 mm to about 5 mm.

By way of example, to secure a wire harness to the cable tie 30, the tie portion 32 may be wrapped around the wire harness in a direction 60 such that the distal end 38 of the tie portion 32 engages the slot 40. The recess 54 is configured to accommodate the tie portion 32, thereby enabling the cable tie 30 to be mounted flush with a mounting surface of a support structure. As previously discussed, once the tie portion 32 is tightened around the wire harness, the cable tie 30 may be secured to the support structure with a fastener that passes through the opening 42.

Figure 5:
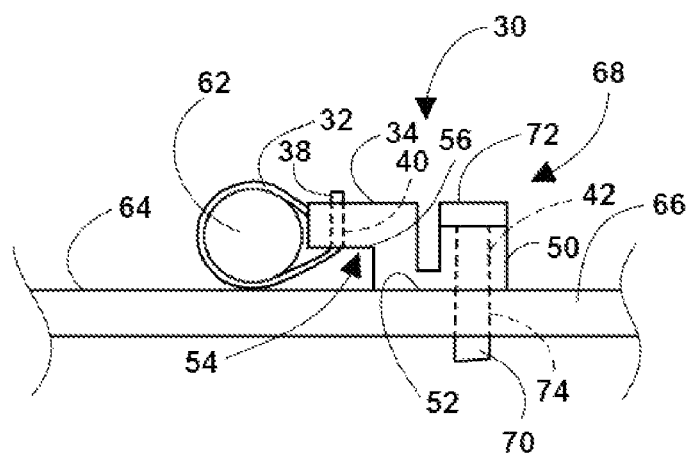
FIG. 5 is a side view of the cable tie shown in FIG. 3, in which a tie portion of the cable tie is wrapped around a wire harness to secure the wire harness to the cable tie.

FIG. 5 is a side view of the cable tie 30 shown in FIG. 3, in which the tie portion 32 is wrapped around a wire harness 62 to secure the wire harness 62 to the cable tie 30. As illustrated, the recess 54 facilitates passage of the tie portion 32 between the support-facing surface 56 of the mounting portion 34 and a mounting surface 64 of a support structure 66. As a result, the cable tie 30 is mounted flush with the mounting surface 64, thereby providing a desirable visual appearance.

In the illustrated embodiment, the cable tie 30 is secured to the support structure 66 with a fastener, such as the illustrated screw 68. As illustrated, the screw 68 includes a shaft 70 and a head 72. The shaft 70 extends through the opening 42 in the mounting portion 34 and a corresponding opening 74 in the support structure 66. In certain embodiments, the shaft 70 is threaded, and configured to engage corresponding threads in the opening 74 of the support structure 66. In such embodiments, the cable tie 30 may be secured to the support structure 66 by aligning the openings 42 and 74, inserting the screw 68 within the mounting structure opening 42, and driving the screw 68 in rotation until the head 72 bears against the boss 50. As previously discussed, a torque tool may be employed to drive the screw 68 in rotation until a positive indication is provided (e.g., via a visible and/or audible indicator on the torque tool) that a desired torque is achieved. Because an installer receives feedback indicative of proper screw installation (e.g., through the visible and/or audible alert), the possibility of improperly mounting the cable tie 30 to the support structure 66 is substantially reduced.

Figure 6:
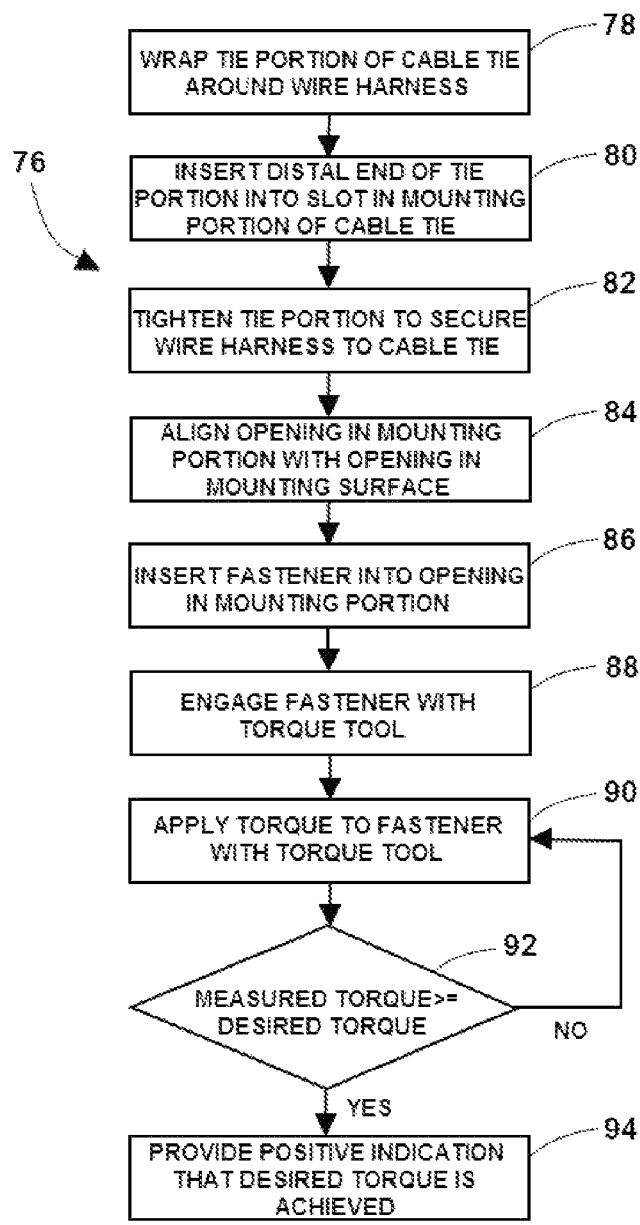
FIG. 6 is a flow diagram of an embodiment of a method for mounting a wire harness within a vehicle interior.

FIG. 6 is a flow diagram of an embodiment of a method 76 for mounting a wire harness within a vehicle interior. First, as represented by block 78, the tie portion of the cable tie is wrapped around a wire harness. A distal end of the tie portion is then inserted into a slot in the mounting portion of the cable tie, as represented by block 80. Next, as represented by block 82, the tie portion is tightened to secure the wire harness to the cable tie. For example, as previously discussed, the tie portion may include multiple teeth distributed along a longitudinal axis of the tie portion, and the mounting portion may include a ratcheting mechanism disposed within the slot. The ratcheting mechanism is configured to engage the teeth of the tie portion, thereby blocking removal of the tie portion from the slot, and securing the wire harness to the cable tie.

Once the wire harness is secured to the cable tie, the cable tie may be coupled to a support structure within the vehicle interior. First, as represented by block 84, an opening in the mounting portion is aligned with a corresponding opening in a mounting surface of the support structure. A fastener is then inserted into the opening in the mounting portion, as represented by block 86. Next, a torque tool engages the fastener, as represented by block 88, and torque is applied to the fastener to induce the fastener to rotate, as represented by block 90. As represented by block 92, torque continues to be applied until a measured torque is greater than or equal to a desired torque. The desired torque may correspond to a torque sufficient to secure the cable tie to the support structure. Once the desired torque is achieved, a positive indication is provided to an installer indicating that the fastener is properly secured to the support structure. For example, the torque tool may include an indicator that illuminates when the desired torque is achieved, thereby indicating that the fastener is properly secured. As described in the illustrated method, the wire harness is coupled to the cable tie before the cable tie is secured to the support structure. However, it should be appreciated that, in alternative embodiments, the cable tie may be secured to the support structure before the wire harness is coupled to the cable tie.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A cable tie for mounting a wire harness within a vehicle interior, comprising:
   a mounting portion having an opening configured to receive a fastener for securing the cable tie to a support structure, the opening having a first longitudinal axis; and
   a tie portion extending from the mounting portion, wherein the tie portion is configured to wrap around the wire harness to secure the wire harness to the cable tie, and the tie portion is laterally offset from the opening along a direction substantially perpendicular to a longitudinal axis of the tie portion;
   wherein the mounting portion comprises a slot having a second longitudinal axis and a recess adjacent to the slot, the recess is configured to establish a gap between a support-facing surface of the mounting portion and a mounting surface of the support structure, the slot is configured to receive a distal end of the tie portion to facilitate securing the wire harness to the cable tie, and the second longitudinal axis is fixed in an orientation approximately parallel to the first longitudinal axis of the opening.

2. The cable tie of claim 1, wherein the tie portion comprises a plurality of teeth distributed along the longitudinal axis, and the mounting portion comprises a ratcheting mechanism disposed within the slot, wherein the ratcheting mechanism is configured to engage at least one of the plurality of teeth to block removal of the tie portion from the slot.

3. The cable tie of claim 2, wherein the ratcheting mechanism is fixed relative to the opening.

4. The cable tie of claim 1, wherein the gap is configured to facilitate passage of the tie portion between the support-facing surface and the mounting surface when the cable tie is secured to the support structure.

5. The cable tie of claim 1, wherein the fastener comprises a screw configured to secure the cable tie to the support structure via rotation of the screw.

6. The cable tie of claim 5, wherein the screw is configured to be driven in rotation by a torque tool, and the tie portion is laterally offset from the opening by a distance sufficient to enable the torque tool to engage the screw without contacting the tie portion.

7. The cable tie of claim 1, wherein the opening extends through a boss on the mounting portion.

8. The cable tie of claim 1, wherein the cable tie is composed of a material comprising nylon.

9. A cable tie for mounting a wire harness within a vehicle interior, comprising:
   a tie portion configured to wrap around the wire harness to secure the wire harness to the cable tie; and
   a mounting portion configured to secure the cable tie to a support structure, wherein the tie portion extends from the mounting portion, the mounting portion comprises a slot configured to receive a distal end of the tie portion, the mounting portion comprises a recess adjacent to the slot, the mounting portion comprises a first mounting surface configured to contact a first portion of a second mounting surface of the support structure, the mounting portion comprises a support-facing surface configured to generally oppose a second portion of the second mounting surface of the support structure while the cable tie is secured to the support structure, the recess is configured to establish a gap extending between the support-facing surface of the mounting portion and the second portion of the second mounting surface of the support structure, and the gap is configured to receive and to facilitate passage of the tie portion between the support-facing surface and the second portion of the second mounting surface while the cable tie is secured to the support structure.

10. The cable tie of claim 9, wherein the mounting portion includes an opening configured to receive a fastener for securing the cable tie to the support structure.

11. The cable tie of claim 10, wherein the fastener comprises a screw configured to be driven in rotation by a torque tool.

12. The cable tie of claim 10, wherein the slot comprises a first longitudinal axis, and the first longitudinal axis is approximately perpendicular to the first and second portions of the second mounting surface of the support structure while the cable tie is secured to the support structure.

13. The cable tie of claim 9, wherein the tie portion comprises a plurality of teeth distributed along a longitudinal axis of the tie portion, and the mounting portion comprises a ratcheting mechanism disposed within the slot, wherein the ratcheting mechanism is configured to engage at least one of the plurality of teeth to block removal of the tie portion from the slot.

14. A system for mounting a wire harness within a vehicle interior, comprising:
   a cable tie comprising a tie portion configured to wrap around the wire harness and a mounting portion comprising a first opening configured to receive a fastener to secure the cable tie to a support structure of the vehicle interior;
   wherein a recess in the mounting portion establishes a gap between a support-facing surface of the mounting portion and a mounting surface of the support structure, and the gap is configured to receive a distal end of the tie portion to facilitate securing the wire harness to the cable tie;
   wherein the tie portion is positioned relative to the mounting portion such that the wire harness is disposed adjacent to the support structure and adjacent to a side surface of the mounting portion extending between the support-facing surface and a top surface of the mounting portion while the wire harness is secured to the cable tie and while the cable tie is secured to the support structure.

15. The system of claim 14, wherein the first opening is positioned relative to the tie portion such that the first opening is accessible and is not blocked by the wire harness while the wire harness is secured to the cable tie.

16. The system of claim 14, comprising a slot extending between the support-facing surface of the mounting portion and the top surface of the mounting portion and configured to receive the distal end of the cable tie to secure the wire harness to the cable tie.

17. The system of claim 14, wherein the tie portion is laterally offset from the first opening along a direction substantially perpendicular to a longitudinal axis of the tie portion.

18. The system of claim 14, wherein no portion of the mounting portion of the cable tie is disposed between the wire harness and the support structure while the cable tie is secured to the support structure.

* * * * *